United States Patent Office 2,905,526
Patented Sept. 22, 1959

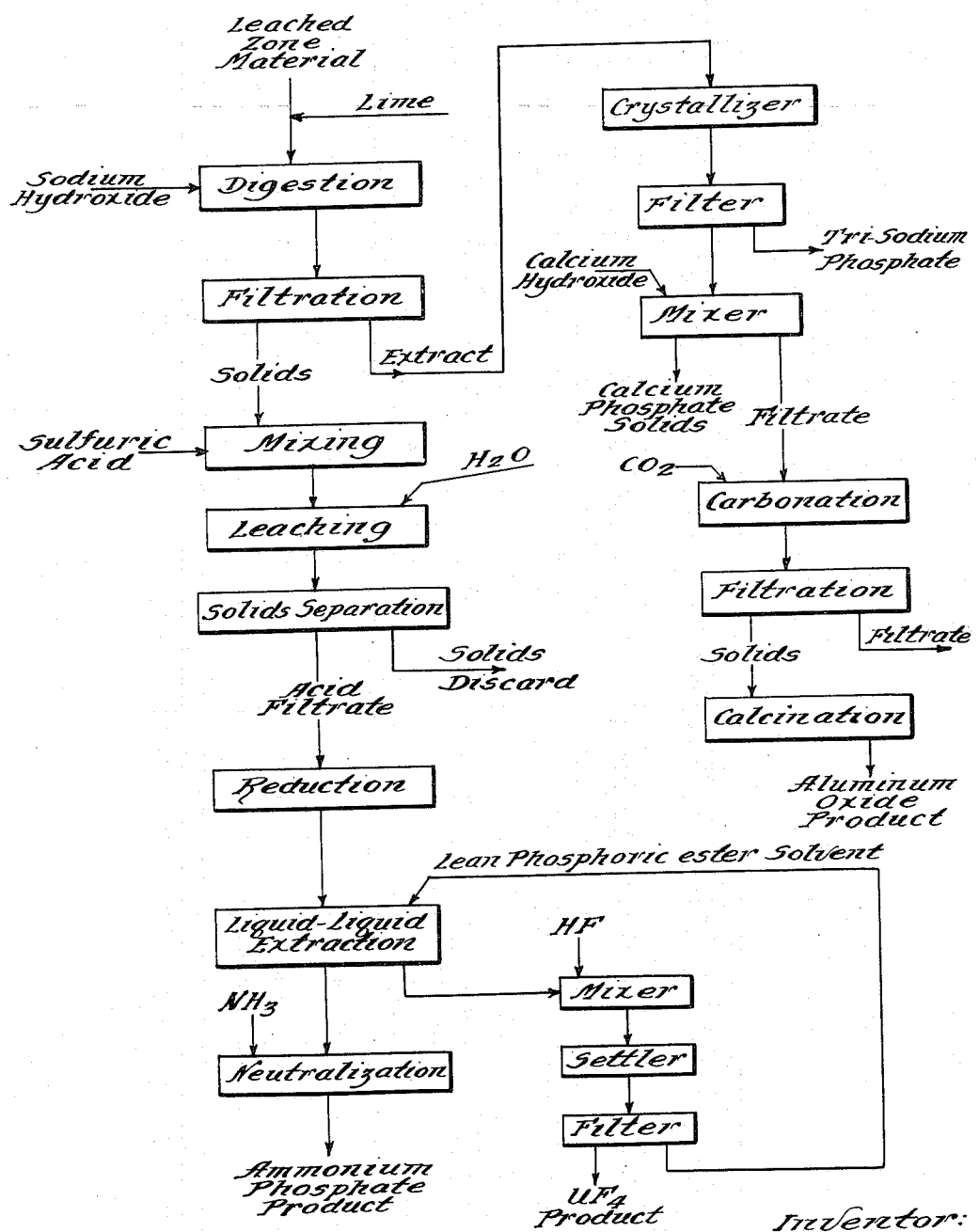

2,905,526

METHOD OF PROCESSING ORE MATERIAL

Robert F. McCullough, Glenview, Ill., assignor, by mesne assignments, to the United States of America as represented by the United States Atomic Energy Commission Application July 6, 1955, Serial No. 520,378

4 Claims. (Cl. 23—14.5)

This invention relates to a process for the recovery of certain mineral values found in phosphate-bearing ore materials, minerals and mineral residues. More particularly, it relates to the recovery of certain mineral values from high aluminum content phosphate-bearing materials. Still more particularly, it relates to the recovery of aluminum and phosphorus and minor values from leached zone material found in the Florida pebble phosphate fields.

High alumina content is a characteristic of leached zone material, transition zone material and phosphate slimes obtained by classification of phosphate matrix, all three materials being found in the Florida pebble phosphate fields.

Leached zone material, for example, consists of a sandy or silty material containing aluminum and phosphorus with other minor values which are held within minerals, predominantly composed of calcium, aluminum and phosphate.

The process of the present invention has to do with the recovery of values from materials chemically considered to be mixtures generally of hydrated aluminum, iron and calcium aluminum phosphates, as well as some calcium phosphates. Analyses of leached zone material show the following representative proportions of chemical components:

| | Percent |
|---|---|
| $P_2O_5$ | 8.7 |
| $Al_2O_3$ | 8.8 |
| CaO | 6.4 |
| Acid insolubles | 68.7 |

When aluminum-calcium phosphate bearing ores, of which leached zone material is representative, are processed to dissolve the various minerals, recoveries in solution may be high, but the overall recovery of the individual components has heretofore been relatively low. For example, a maximum recovery of about 70% of the aluminum in solution is considered excellent when leached zone material has been solubilized using sulfuric acid under economic conditions.

It is a primary object of this invention to overcome the shortcomings and disadvantages of processes currently in use.

It is another object of this invention to provide a method of recovery wherein predominantly aluminum values are obtained in a solution containing relatively small amounts of phosphates.

It is still another object of this invention to provide a method wherein the phosphates are obtained as an acidic solution containing only relatively small amounts of iron and alumina.

It is still a further object of this invention to provide a method whereby super concentrates of ores are obtained for solubilizing with sulfuric acid.

These and other objects of this invention will be apparent to those skilled in the art from the following description.

In the process of the instant invention, aluminum-bearing phosphatic materials, with or without admixture with alkaline earth material such as lime, is digested with an alkali metal reagent such as caustic soda and the slurry filtered to remove insoluble solids from the aqueous alkali aluminate solution. The resulting aluminate solution is treated to recover aluminum as will be hereinafter described. Insoluble solids representing an enriched phosphate concentrate are then subjected to digestion with sulfuric acid to convert the phosphates to the soluble form whereby they can be recovered by known methods.

More in detail, the process treats high alumina content material on an "as-is" basis as mined or after suitable classification operation in either wet or dry form. The materials may also be treated as by calcining prior to being processed in the manner hereinafter described. It has been found advantageous, however, but not necessary to the invention when dealing with leached zone ore to split this material to eliminate a large percentage of the caustic insoluble components present therein, which are quartz, sand and apatite. These materials normally have a coarser particle size than the other components. The ore is readily split into a small particle size fraction and a coarser particle size fraction. This split is usually effected at a size classification point in the range from about 150 mesh to about 220 mesh. The fraction containing the smaller particles is the more useful for mineral recovery as can be seen from the following typical analysis of a plus 200 mesh fraction and the minus 200 mesh fraction.

| Mineral Values | +200 Mesh | −200 Mesh |
|---|---|---|
| $P_2O_5$ | 5.4 | 14.7 |
| $Al_2O_3$ | 1.7 | 25.3 |
| CaO | 5.5 | 9.2 |
| $Fe_2O_3$ | 1.6 | 3.1 |
| Acid Insolubles | 83.1 | 38.6 |

To recover the mineral values the leached zone material as mined is preferably slurried with water and subjected to a series of classification operations and thickening operations in order to segregate the minus 200 mesh portion thereof. Roughly, this minus 200 mesh portion will constitute about 25% to about 45% of the original material.

In the preferred mode of operation the phosphate-bearing material may be mixed with lime in the ratio necessary to give an excess of between about 5% and about 50% of calcium oxide over that required to give a CaO to $P_2O_5$ mol ratio of 2.9 to 1. The time of addition of the lime is not as important as the amount. The lime may be added to dry solids in whole or in part or after the solids have been slurried, or the lime may be mixed with the alkali metal solubilizing reagent and the solids added to the aqueous medium. Generally the leached zone material is slurried with water to produce a solids content slurry of between about 5% and about 75% solids, with a solids content below about 40% preferred.

Leached zone material is next subjected to reaction with water soluble alkaline agents preferably in the presence of alkaline earth metal mol ratio adjusting additive. Such agents may be sodium hydroxide, potassium hydroxide and the like, or mixtures thereof, or in admixture with such agents as salt, sodium carbonate, potassium carbonate, sodium aluminate and the like. The clay mixture is treated with dilute or moderately concentrated solutions of said agents in quantities sufficient to react with the aluminum to convert these constituents to approximately the water soluble dialkali state, but not sufficient to exceed the trialkali ratio of alkali to $Al_2O_3$. The concentration of alkali calculated as NaOH in the alkaline extraction liquor may range from about 2% to about 20% or higher by weight and preferably is in the range of about 4% to about 10%.

Temperature of the digested slurry mixture is generally maintained in the range of about 25° C. to about 120° C., and preferably in the range of about 60° C. to about 90° C. when operating at atmospheric pressures. Digestion may also be carried out under superatmospheric pressures in such equipment as autoclaves at higher or lower temperatures. Digestion is usually carried to the optimum point for extraction of aluminum while avoiding or minimizing the solubilizing of any silica present in the ore mixture. Upon completion of the digestion, the solids are rapidly separated from the solution to minimize loss of aluminate due to hydrolysis. Small amounts of protective colloids such as pectin, dextrin, or the like, may be added to the filtrate to prevent precipitation of colloidal aluminum compounds.

Time of reaction of phosphate-bearing materials with alkali metal reagent such as, for example, sodium hydroxide plus sodium aluminate will depend upon the operating conditions. At atmospheric pressures a reaction time in the range of about 15 minutes to about 90 minutes has been successfully used. Digestion in an autoclave is generally of shorter duration and in most instances a reaction time of about 5 to about 20 minutes has proven satisfactory. Longer periods of digestion, i.e., an excess of one and one-half hours may be used but are not favored because the recovery of alumina is not increased and the solubilizing of undesired components does increase with reaction time. Quantities of the components in the feed which are solubilized using the atmospheric-boiling caustic digestion vary depending upon the minerals present in the feed. Uranium dissolution has been found to vary from about 5% to about 40%, normally about 15%. Alumina dissolution approaches 100% using a feed predominantly containing wavellite. Predominantly kaolinite feeds give $Al_2O_3$ dissolution between about 50% and about 90%. Predominantly pseudowavellite feed, when no alkaline earth metal oxide such as calcium oxide has been added, normally shows $Al_2O_3$ dissolution between about 40% and about 70%. Addition of calcium oxide, to give a $CaO/P_2O_5$ mol ratio of about 3 to 1, to a pseudowavellite feed gives dissolution of $Al_2O_3$ between about 60% and about 90%.

The solids residue remaining after the extraction and filtration operations may be washed free of caustic and may be further processed to recover the phosphate values as by reaction with sulfuric acid to convert $P_2O_5$ values to phosphoric acid.

The solids free extract may be diluted or concentrated, as the case may be, to a sodium aluminate concentration in the range of about 30% to about 60%, and the solution treated in any of several ways, i.e., by seeding with freshly precipitated aluminum hydroxide, by passing carbon dioxide through the solution, and the like, to precipitate alumina. If the filtrate is carbonated, a precipitate is formed which when dry is low in $P_2O_5$ content, said content generally being of the order of about 0.01% to about 0.04%. Recovery of a precipitate from the carbonated solution may be carried out by settling the precipitate and filtering an underflow of aluminum hydroxide solids or simply by filtering the entire reaction mixture. The recovered aluminum hydroxide material may be calcined in fire-brick lined rotary kilns or the like at temperatures of 800° C. to about 1200° C. to produce alumina ($Al_2O_3$) of metallurgical grade.

Insoluble solids remaining from caustic digestion of the phosphatic-bearing ore material under conditions generally effecting maximum recovery of aluminum and minimum solubilizing of phosphates are mixed with strong acidic solubilizing agents such as sulfuric acid, hydrochloric acid, nitric acid, sulfur dioxide and the like in an amount sufficient to convert the phosphates to the soluble state which may vary from substantially phosphoric acid to substantially monocalcium phosphate.

If the conversion of phosphates is to monocalcium phosphate, the solids are converted with aqueous acid solution to paste form such as is sent to dens to age into superphosphates. Following leaching and separation of the unreacted material from aqueous solution of soluble reaction products, the unreacted material may be subjected to a second agitation reaction with strong acidic agents with or without oxidizing agents, to increase the solubilization of uranium values.

More in detail, the insoluble solids are mixed with sulfuric acid of any convenient dilution, for example, from about 51° to about 55° Bé., in such a proportion that there will be present in the mix between about 90% and about 120% of the stoichiometric equivalent amount of sulfuric acid required to convert all of the $P_2O_5$ in the solids to monocalcium phosphate, allowing in addition enough acid to also react with the impurities such as iron, unleached aluminum, etc.

The heavy slurry prepared using, for example, 110% sulfuric acid acidulation once having been thoroughly mixed is passed onto a continuous and moving belt on which it is allowed to remain for a period of time sufficient to permit the soupy material to partially harden or set. This is usually between about 20 and about 60 minutes, but is not critical so long as the material is partially set when discharged from the belt.

When handled as above described, the material is easily removed after storage for from about 1 to about 30 days or more by means of mechanical shovels or scoops or manually. The material remains in the storage pile to allow the reactions to approach equilibrium and to bring the water soluble $P_2O_5$ up to the maximum within practical limits.

The aged superphosphate or acidified material is then agitated with previously prepared dilute leached solution to which water may have been added, if no water as such is added during the leaching. Sufficient liquid leaching medium is added so that the resulting slurry contains between about 30% and about 45% solids, although more concentrated or more dilute slurries may be formed if desired. The agitation and slurrying is for a short period, usually 5 to 15 minutes being sufficient. The slurry operation may be carried out at hot or atmospheric temperatures, but preferably while hot in order to reduce viscosity and to aid in subsequent faster separation of solids from liquid.

The aqueous phosphatic solution is then separated from the solids. Separation of these solids may be carried out in any convenient and conventional manner such as for example, by countercurrent multi-stage filtration or decantation, preferably at temperatures of about 50° C. to 60° C. or by centrifuging or other equivalent operation.

The separated solids normally discarded as waste are next reacted in any one of three ways to recover the $P_2O_5$ and uranium content of the solids in predominantly phosphoric acid solution, or predominantly monocalcium phosphate solution, or in solution containing various proportions of phosphoric acid and monocalcium phosphate, i.e., wet process, such as the standard commercial process for the manufacture of phosphoric acid; autoclave super-atmospheric digestion; or the acid leaching system, such as is described in the first stage above. Preferably, the solids are agitated with sufficient aqueous solution of sulfuric acid to convert the unreacted phosphatic material which remains therein to phosphoric acid. In this method of secondary digestion, the unreacted solids are mixed with a quantity of sulfuric acid, for example, of 66° Bé. strength. The exact amount of acid employed will vary with the composition of the unreacted solids and the quantity of acid added may be determined as is well known in the art of phosphoric acid manufacture. Preferably a relatively small deficiency of sulfuric acid is used so that the resulting crude phosphoric acid contains no significant free sulfuric acid and preferably contains a very small amount of monocalcium phosphate. The mix of unreacted solids, acid and water is agitated for a time sufficient to effect substantially complete reaction of the acid used, the resultant product being an insoluble precipitate consisting chiefly of calcium, sulfate and liquor containing essentially phosphoric acid. Normally almost complete uranium and phosphate dissolutions are obtained using this procedure. Alumina dissolution normally varies between about 70% and about 90% during the acid treatment.

The phosphoric acid solution is separated from the acid insolubles and then processed as follows: the aqueous solution is subjected to contact with an organic solvent extractant or to contact with an anion resin to remove the uranium values from the phosphate values. The liquid phosphoric acid solution containing the uranium dissolved therein is preferably before extraction subjected to a reduction reaction. This may be accomplished by electrolytic means or by chemical reaction wherein the solution is treated with metallic iron or other free metals or reducing agents such as ferrous sulfate and sodium sulfoxyaldehyde, capable of reducing the solution, but not substantially introducing cations or anions detrimental to the specifications of phosphatic products subsequently recovered. The reduced aqueous solution is then intimately contacted, stirred or otherwise agitated with the organic solvent phase. This solvent phase is made up preferably of two components, an extractant and a vehicle or extender. The extractant may be one or more of the ortho or pyro-phosphoric acid esters of the alkyl monohydric alcohols. Both the mono and diesters, as well as mixtures of the two, are useful. The butyl, amyl, hexyl, heptyl, o-octyl, iso-octyl, etc., esters with the phosphoric acids are satisfactory for the purpose, but it is preferred to use the esters, either octyl or hexyl alcohol with ortho-phosphoric acid. The extender or vehicle may be any one or more of the common organic solvents such as naphtha, mineral spirits, carbon tetrachloride, trichloroethylene, toluene, xylenes and the like.

The concentration of the extractant of the extender or vehicle may vary widely between about one and about 100%, preferably between about 5 and about 10%. The volume ratio of aqueous phase to organic phase also may vary within wide limits, for example, between about 1:1 and about 40:1, preferably between about 5:1 and about 20:1. A continuous extraction is usually carried out in multi-stage countercurrent extractors, for instance, using about six stages. After contact of the two phases, the aqueous phase is withdrawn from the bottom or first stage of the contacting operation. The organic phase is treated preferably with aqueous HF in about 5 molar excess over that required to produce uranium tetrafluoride. This precipitated material is recovered by filtering, centrifuging and the like. The stripped organic solvent is recycled for further extraction use in the process.

The invention will be further understood from the following examples.

*Example I*

A representative minus 200 mesh leached zone fraction obtained by classification of leached zone material from the Florida phosphate fields when dried assayed: 13% $P_2O_5$, 6.4% CaO, 22.7% acid soluble $Al_2O_3$, 0.6% $Fe_2O_3$, 0.035% $U_3O_8$ and 34.6% acid insoluble material.

This leached zone material was mixed with water to produce a slurry of approximately 16% solids concentration, 57 parts by weight of sodium carbonate and 71 parts by weight of calcium hydroxide were added per each 1,000 parts by weight of 16% solids slurry and the mixture heated to approximately 90° C. for about one hour.

The slurry was filtered and the cake washed with water. The combined filtrate and wash water gave a solution weighing approximately 1,960 parts by weight. This solution was evaporated to produce a concentrate weighing approximately 1,550 parts by weight and the filter cake was dried at 100° C. to a dry weight of approximately 220 parts by weight. The cake and the liquor phase analyzed as follows:

|  | Wt. Percent of Solution | Wt. Percent of Filter Cake |
| --- | --- | --- |
| $Al_2O_3$ | 1.34 | 7.12 |
| $P_2O_5$ | 0.0005 | 9.60 |
| $U_3O_8$ |  | 0.021 |

Recovery of aluminum in the filtrate is about 57%. This filtrate also contained approximately 18% $U_3O_8$ recovery.

*Example II*

Leached zone material of approximately the same analysis as used in Example I was treated at a rate of about two tons per hour in a paddle mixer continuous operation with 51° Bé. aqueous sulfuric acid at about 115° F. to the extent of about 110% acidulation or a rate of about 1:094 tons per hour of acid of the above gravity. The mixer paddles were rotated at about 120 r.p.m. and the mixing time averaged about one minute. The soupy mix was continuously discharged onto a moving belt where it remained for about one hour before discharge to the storage pile. The mix was allowed to age for approximately 45 days.

The cured acidulated mix was subjected to a four stage leaching operation, the water added being in the proportion of about 1.3 pounds of water per pound of mix on a dry basis, to recover solution having a gravity of about 30° Bé.

This leached solution was subjected to contact with about 2300 grams of powdered metallic iron per 100 gallons of leached solution and agitated for about 30 minutes after which the solids were filtered from the solution. This liquid was then contacted at a rate of about 100 gallons per hour of an organic solvent composed of about 9 parts by volume of kerosene and 1 part by volume of a mixture of the mono and diesters of the ortho phosphoric acid of n-octyl alcohol. Contact was maintained for about two minutes. The organic solvent was separated from the aqueous phase and the aqueous phase neutralized with ammonia to a pH of approximately 7 to recover the $P_2O_5$ values. The uranium rich organic solvent was treated with about 10 gallons per hour of 30% aqueous sulfuric acid to precipitate calcium sulfate. The aqueous slurry was removed and discarded and the rich organic solvent was treated with 15% aqueous hydrofluoric acid. Precipitate was filtered from the aqueous phase and approximately 0.41 pound of $U_3O_8$ as a 60% $UF_4$ cake was recovered per 1000 pounds of ore used.

This constituted a recovery of 70% $U_3O_8$, 80% $P_2O_5$, and 70% $Al_2O_3$.

*Example III*

A representative "as-mined" leached zone was digested with sodium hydroxide, having molarity of about 3.0 and giving a hydroxide content equivalent to the combined amounts of sodium carbonate and calcium hydroxide of Example I, for 20 minutes at 85° C. The liquor and solid phases were separated and the insolubles washed with water. The liquor phases were cooled to 20° C. and allowed to stand for 12 hours to crystallize trisodium phosphate (TSP). Upon separation of the TSP, hydrated lime 20% solids slurry was added to the resulting filtrate, at a $CaO/P_2O_5$ mol ratio of 3.0 for removal of trace phosphates as precipitated tricalcium phosphate, and aluminum recovered from the resulting filtrate.

Cake or caustic insolubles from the initial leached zone digestion were dried at 110° C., to give a solids residue of the following composition:

| | Percent |
|---|---|
| $P_2O_5$ | 6.37 |
| $Al_2O_3$ | 1.23 |
| $Fe_2O_3$ | 1.20 |
| CaO | 8.05 |
| Acid insolubles | 77.33 |
| U | 0.019 | and then reacted for one hour at 90° C. with 0.45 part sulfuric acid per pound of the caustic insoluble residue using 40% sulfuric acid. Upon separation of the liquor phases uranium was recovered following the procedure illustrated in Example II to give 0.306 pound 60% $U_3O_8$ cake per 1000 pounds of the residue from the caustic digestion. This constituted about 97% $U_3O_8$ recovery. Recoveries in acid solution for $P_2O_5$ and $Al_2O_3$ were 77% and 65%, respectively.

The flow-sheet is illustrative of the claimed process.

Having thus described my invention, what I claim is:

1. A method for recovering the mineral values of leached zone material from the Florida phosphate fields which comprises digesting said leached zone material with an alkali metal reagent, removing insoluble solids from the digest solution, admixing said insoluble solids with sulfuric acid, said sulfuric acid being added in an amount sufficient to convert caustic insoluble material to water soluble reaction products, contacting the solution of water soluble reaction products with an extractant medium for uranium comprising an organic extender and a phosphoric acid ester of an alkyl monohydric alcohol and recovering from the uranium-free aqueous solution of reaction products at least the $P_2O_5$ components.

2. A method for recovering the mineral values of leached zone material from the Florida phosphate fields which comprises digesting said leached zone material with an alkali metal reagent, removing insoluble solids from the digest solution, admixing said insoluble solids with sulfuric acid, said sulfuric acid being added in an amount sufficient to convert caustic insoluble material to water soluble reaction products, subjecting the solution of water soluble reaction products to a reduction reaction, contacting the solution of water soluble reaction products with an extractant medium for uranium comprising an organic extender and a phosphoric acid ester of an alkyl monohydric alcohol and recovering from the uranium-free aqueous solution of reaction products at least the $P_2O_5$ components.

3. A method for recovery of mineral values from leached zone material which comprises admixing with the leached zone material an amount of alkali metal reagent sufficient to convert the aluminum and phosphate constituents at least to the dialkali product state, removing insoluble solids from the digest solution, recovering aluminum in the form of aluminum tri-hydrate from the digest solution, digesting the insoluble solids with sulfuric acid, said sulfuric acid being added to the extent of between about 90% and about 120% of the stoichiometric equivalent amount required to convert all of the $P_2O_5$ in the solids to monocalcium phosphate, leaching the water soluble reaction products with aqueous medium, contacting the solids-free solution with metallic iron to effect reduction of uranium to the tetravalent state, contacting the reduced solution with an extractant medium for uranium comprising organic extender and a phosphoric acid ester of octyl alcohol, separating extracted solution and uranium rich ester solution, reacting extractant solution with acidic solution comprising water and hydrofluoric acid to precipitate uranium as $UF_4$ and recovering $P_2O_5$ values from the uranium-free aqueous solution.

4. A method of recovering mineral values from leached zone material of the Florida phosphate fields which comprises digesting the leached zone material with sodium hydroxide, separating the insoluble solids from digest solution, cooling the digest solution, crystallizing sodium phosphates, separating the phosphate salt from resultant solution, adding lime to the resultant solution to precipitate calcium phosphates, concentrating the solution and cooling to crystallize out aluminum tri-hydrate, digesting the caustic insoluble solids with sulfuric acid, said sulfuric acid being added in quantity to produce a phosphoric acid solution, subjecting the phosphoric acid solution to a reduction reaction, contacting the reduced solution with an extractant medium having an affinity for uranium comprising organic extender and a phosphoric acid ester of octyl alcohol at a volume ratio of 10:1, separating extracted solution and uranium rich ester solution, precipitating uranium from the uranium rich ester solution and recovering $P_2O_5$ values from the uranium-free aqueous solution.

References Cited in the file of this patent

UNITED STATES PATENTS

| 1,845,876 | Huber | Feb. 16, 1932 |
| 2,079,847 | Fisk | May 11, 1937 |
| 2,549,549 | Wall | Apr. 17, 1951 |
| 2,557,891 | Porter | June 19, 1951 |
| 2,591,436 | James | Apr. 1, 1952 |
| 2,769,686 | McCullough et al. | Nov. 6, 1956 |
| 2,785,956 | Dunn | Mar. 19, 1957 |
| 2,811,411 | Calkins | Oct. 29, 1957 |
| 2,815,264 | Calkins et al. | Dec. 3, 1957 |
| 2,819,145 | McCullough et al. | Jan. 7, 1958 |

OTHER REFERENCES

RMO–2041, AEC Document, February 28, 1955, pages 6, 7, 11, 22, 44.